(12) United States Patent
Abe

(10) Patent No.: US 6,618,491 B1
(45) Date of Patent: Sep. 9, 2003

(54) MOVING IMAGE PROCESSOR CAPABLE OF OUTPUTTING MOVING IMAGE AS STILL IMAGE

(75) Inventor: Hideo Abe, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/443,276

(22) Filed: Nov. 18, 1999

(30) Foreign Application Priority Data

Dec. 24, 1998  (JP) ............................................ 10-365972

(51) Int. Cl.⁷ ............................ G06K 9/00; G06K 9/36; G06K 9/46; H04N 5/91; H04N 5/225

(52) U.S. Cl. ........................ 382/107; 382/236; 386/96; 386/121

(58) Field of Search .................................. 382/107, 236

(56) References Cited

U.S. PATENT DOCUMENTS 5,550,965 A * 8/1996 Gabbe et al. ................ 715/512
5,576,950 A * 11/1996 Tonomura et al. .......... 386/121
5,974,218 A * 10/1999 Nagasaka et al. ............. 386/46
6,256,419 B1 * 7/2001 Nagasaka et al. ........... 382/236
6,487,360 B1 * 11/2002 Sumiyoshi et al. ........... 386/52

FOREIGN PATENT DOCUMENTS

JP      8-23474     1/1996
JP      2557338     9/1996

* cited by examiner

*Primary Examiner*—Leo Boudreau
*Assistant Examiner*—Hussein Akhavannik
(74) *Attorney, Agent, or Firm*—Frishauf, Holtz, Goodman & Chick, P.C.

(57) ABSTRACT

A moving image data fetch section extracts frame images as well as audio information from moving image data and stores them in a frame memory. A feature amount detection section detects the change of a feature amount included in the frame images constituting the moving image data, and an image selection section selects specific frame images based on the detected image changing characteristics or audio changing characteristics. An image processing section selects a frame image having particularly great change of the image or audio data from among the selected frame images as a to-be-processed image and processes the selected image to have a predetermined expression form. A monitor, a printer or the like outputs the specific frame images selected by the image selection section and the frame image selected and processed by the image processing section as still images.

13 Claims, 12 Drawing Sheets

MOVING IMAGE PROCESSOR CAPABLE OF OUTPUTTING MOVING IMAGE AS STILL IMAGE

BACKGROUND OF THE INVENTION

The present invention relates to a moving image processor and a moving image processing method. The present invention particularly relates to a moving image processor and a moving image processing method suited for use in an image display apparatus capable of displaying an image, an image printer capable of printing out an image and the like.

In recent years, audio video equipment have been spreading rapidly and their functions have been remarkably improving. High engineering image recording equipment such as a video camera and an electronic still camera have been utilized for ordinary and business purposes in various scenes. Images photographed by these equipment can be easily displayed and outputted on a monitor of a television or a personal computer (to be referred to as "PC" hereinafter) connected to the equipment through a liquid crystal panel mounted on equipment main body, a cable or the like, and can be directly printed out through a printer or the like.

As a method of displaying, as still images, ordinary moving image information (including video information for television broadcasting and the like) in addition to moving images photographed by a video camera, an electronic still camera or the like, there has been conventionally known a method of, for example, extracting an arbitrary frame image from a plurality of frame images constituting the moving information and displaying only the extracted frame image or, in case of extracting a plurality of frame images, sequentially displaying the frame images or batch-displaying division image planes.

In the above-stated method of displaying still images in the moving image, the photographic contents such as the change of photographic situations and a series of object movements cannot be recognized until all of the moving image data are reproduced and displayed. Due to this, the user of the moving image processor has to temporarily reproduce and review moving image data, grasp the change of photographic situations, the movement of the object and the like, and select and instruct a frame image in which a desired scene is included. To do so, it disadvantageously takes a lot of time to check the photographic contents. Further, since it is required to carry out various editing jobs (operations) at the time of outputting desired photographic contents as still images, it is extremely inconvenient to carry out the operations.

It is, therefore, an object of the present invention to provide a moving image processor and a moving image processing method capable of improving the ability of expression and convenience at the time of outputting a moving image in the form of still images.

BRIEF SUMMARY OF THE INVENTION

To achieve the above object, according to a preferred embodiment of the present invention, a moving image processor comprises detection means for detecting change of one of a moving image and voice accompanying the moving image; image processing means for changing one of a shape and size of each of still images serving as constituent elements of the moving image in accordance with the change of one of the moving image and the voice detected by the detection means; and image output means for outputting the still images each having one of the shape and the size changed by the image processing means. Accordingly, it is possible to provide a moving image processor capable of enhancing the ability of expression at the time of outputting a moving image in the form of still images.

According to another preferred embodiment, a moving image processor comprises detection means for detecting change of voice accompanying a moving image; image processing means for changing an attribute of each of still images serving as constituent elements of the moving image in accordance with the change of the voice detected by the detection means; and image output means for outputting the still images whose attribute have been changed by the image processing means. Accordingly, it is possible to provide a moving image processor capable of enhancing the ability of expression at the time of outputting a moving image in the form of still images.

In yet another preferred embodiment of the present invention, a moving image processor comprises detection means for detecting change of voice accompanying a moving image; image extraction means for extracting still images of a portion at which the change of the voice detected by the detection means satisfies predetermined conditions, from the moving image; and image output means for outputting the still images extracted by the image extraction means. Accordingly, it is possible to provide a moving image processor capable of enhancing convenience at the time of outputting a moving image in the form of still images.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will now be described with reference to the accompanying drawings.

First Embodiment

Figure 1:
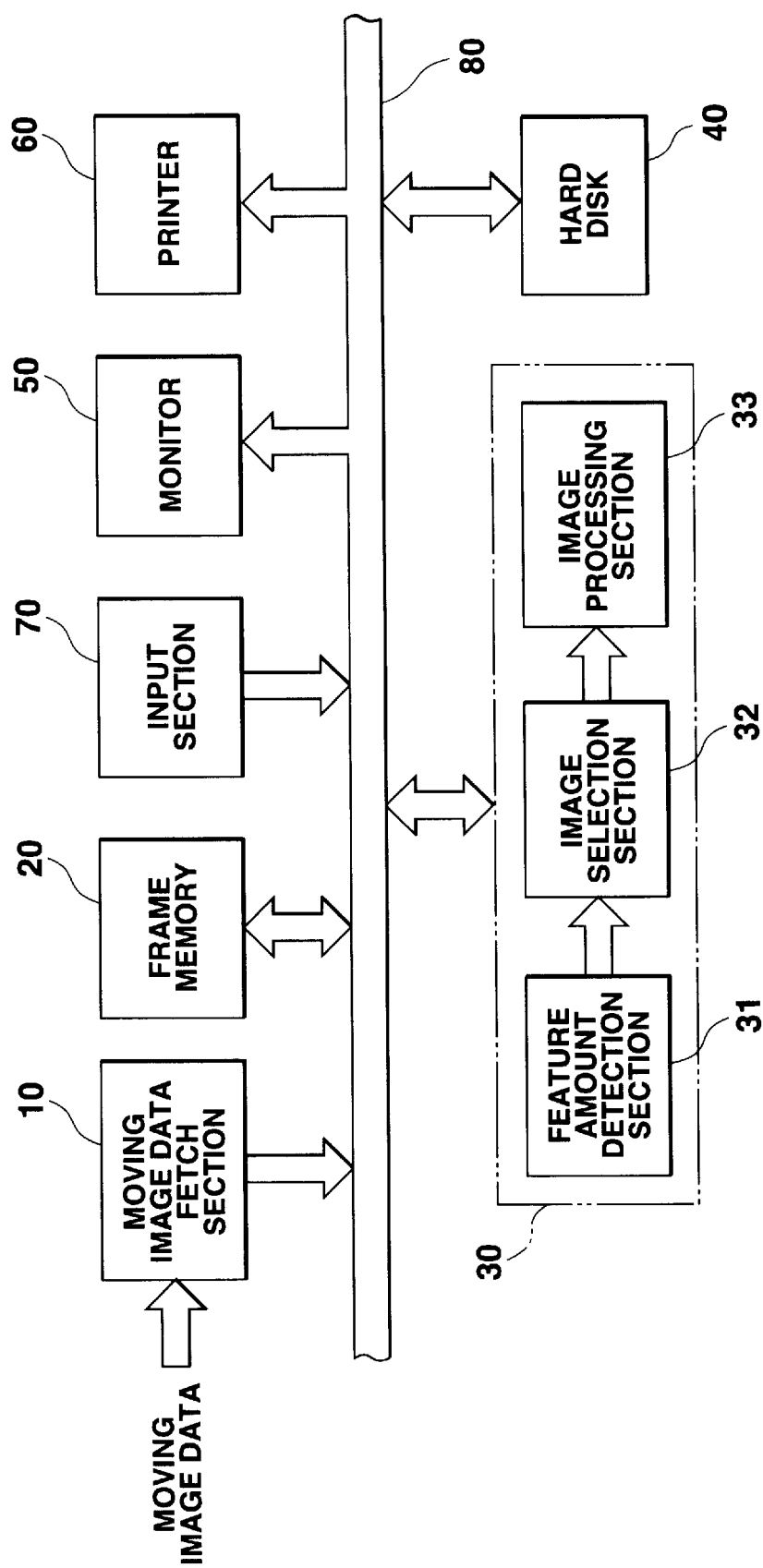
FIG. 1 is a block diagram showing a moving image processor in the first embodiment according to the present invention.

FIG. 1 is a block diagram showing a moving image processor in the first embodiment according to the present invention.

In FIG. 1, the moving image processor comprises: a moving image data fetch section 10, a frame memory 20, a CPU 30, a hard disk 40, a monitor 50 (image output means) such as an LCD, a printer 60 (image output means), an input section 70 (detection level selection means, processing method selection means) such as a key switch and a data/command transmission bus 80. The CPU 30 is constituted to have functions of a feature amount detection section (detection means) 31, an image selection section (image extraction means, the second image extraction means) 32 and an image processing section (image processing means) 33.

These functions will be outlined as follows:

(1) Moving Image Data Fetch Section 10

The moving image data fetch section 10 extracts a plurality of frame images as well as voice information from moving image data and stores the frame memory 20 to be described later. Here, the moving image data may be comprised of video data or a plurality of continuously photographed still images. Alternatively, the moving image data may be comprised only of image information without voice information. In short, according to the present invention, moving image data comprised of at least a plurality of continuous frame images may suffice and the frame images to be fetched may be either analog images or digital images.

The schematic structure of the moving image fetch section 10 will be described with reference to the drawings. In this description, it is assumed that moving image data has a data arrangement in which voice information accompanies image information. Therefore, if moving image data comprised only of image information is an intended target, the constitution of signal-processing voice information is not included in the moving image fetch section 10.

Figure 2:
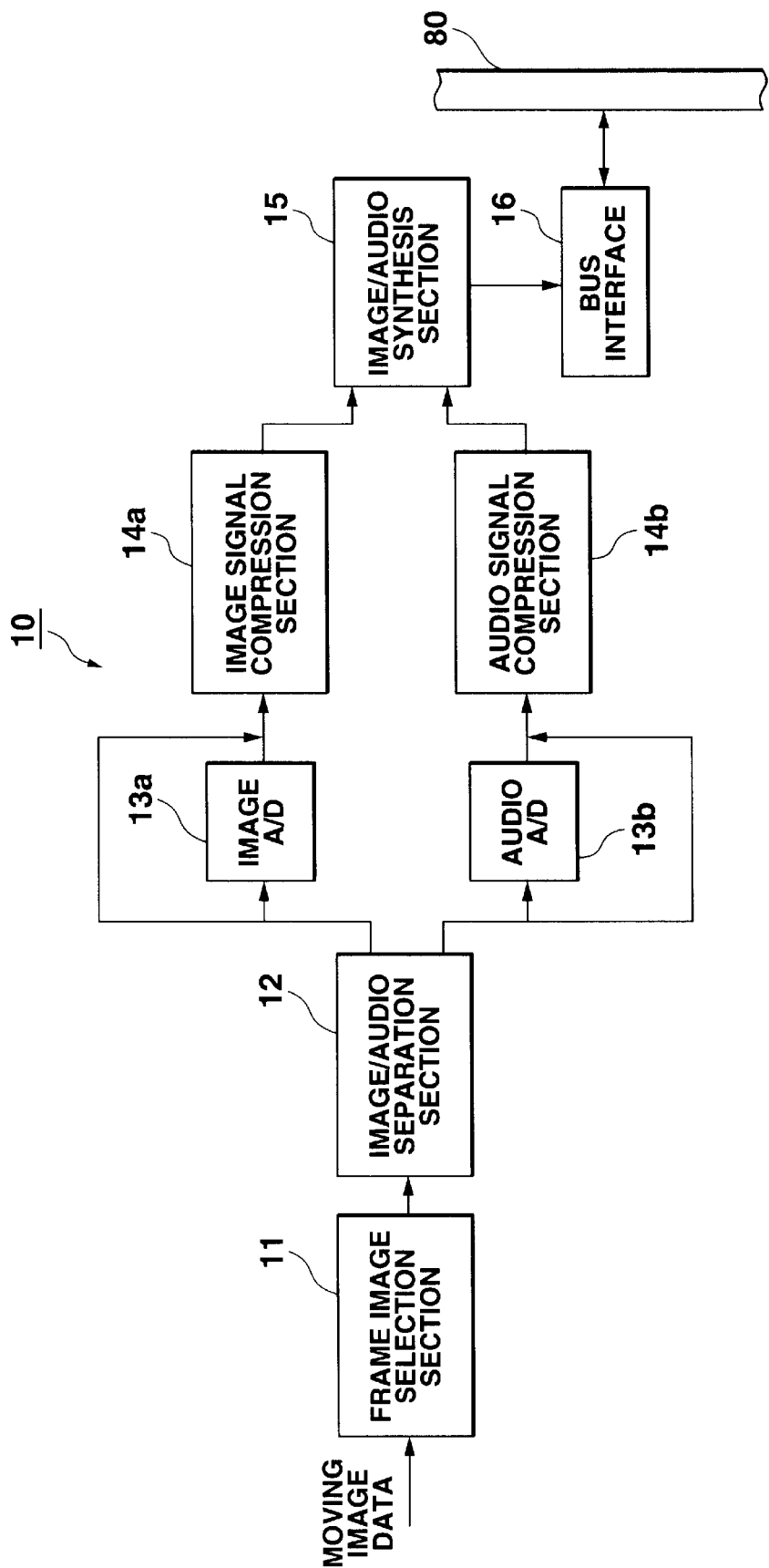
FIG. 2 is a block diagram showing the schematic structure of a moving image fetch section.

In FIG. 2, the moving image data fetch section 10 comprises: a frame image selection section 11, an image/voice separation section 12, an image signal analog-digital converter 13a (to be referred to as "image A/D" hereinafter), a voice signal analog-digital converter 13b (to be referred to as "voice A/D" hereinafter), an image signal compression section 14a, a voice signal compression section 14b, an image/voice synthesis section 15 (to be referred to as "mixer" hereinafter) and a bus interface 16.

The frame image selection section 11 selects and extracts frame images as well as voice information from moving image data at predetermined time intervals in accordance with a command from the CPU 30 to be described later. It is noted that the selected frame images may be the entire frame images constituting the moving data or may be frame image at preset time intervals, e.g., ⅕ seconds' intervals or ⅒ seconds' intervals. The time interval is, however, required to be to the effect that the change of feature amount contained in the moving image data can be detected. The definition of the feature amount will be described later. Also, the time interval used for the selection of frame images can be set using various methods including, for example, a method using a reference value preset by the CPU 30 and a method using an arbitrary value instructed through the input section 70 at the will of the user of the moving image processor.

The image/audio separation section 12 separates an image signal from an audio signal using the difference in frequency band between an image and an audio signal and allows the later signal processings to be executed on individual paths for image signals and audio signals.

If a selected frame image is an analog signal, the image A/D 13a converts the analog image signal into a digital image signal. If audio information accompanying the selected frame image is an analog signal, the audio A/D 13b converts the analog audio signal into a digital audio signal.

The image signal compression section 14a processes the image signal of each frame image which is converted into digital image signal by the image A/D 13a or that which is extracted as a digital image signal by the frame image selection section 11 so as to comply with a predetermined image compression standard. As a frame image compression coding system, a JPEG standard or the like can be applied to this embodiment. Here, the JPEG (Joint Photographic Coding Experts Group) standard is one for compression-coding original image data by a system such as DCT (discrete cosine transfer), quantization and variable length coding. The JPEG serves as an international standard adopted by color facsimile machines, electronic still cameras and the like. Since various formats and standards such as GIF, TIFF, LHA and ZIP other than JPEG are normally utilized as image information compression-coding systems, an appropriate system can be adopted according to the embodiment.

Further, the audio signal compression section 14b processes the audio signal accompanying each of the frame images, converted into a digital audio signal by the audio A/D 13b or extracted as a digital audio signal by the frame image selection section 11 so as to comply with a predetermined audio compression standard. As a audio signal compression coding system, an MPEG standard or the like can be applied. Here, the MPEG (Motion Picture Coding Experts Group) standard is one for compression-coding signals in the moving images comprised of a plurality of time-series continuous images (image planes) using a method of predictively coding differential data resulting from compensating for movements between images. The MPEG standard is also applicable to the compression coding of an audio signal.

As can be seen from the above, if an image signal and an audio signal are compression-coded by means of the JPEG standard and MPEG standard, respectively, it is possible to easily conduct image processing by JPEG standard and MPEG standard compliant software installed in a prevailing PC following the recent spread of internet or the like.

The mixer 15 conducts synthesis processing (pocketing) to one frame data while associating the image and audio signals respectively compression-coded by the predetermined standards, whereas the bus interface 16 converts synthesis-processed frame data to that having the transmission width of the bus 80 and transfers the converted data to the frame memory 20.

(2) Frame Memory 20

The frame memory 20, which is comprised of a DRAM (Dynamic Random Access Memory) or the like, associates the image signal and audio signal (frame data) selected and compression-coded by the moving image data fetch section 10 with header information, and stores the data in an image data storage region designated by the CPU 30.

Figure 3:
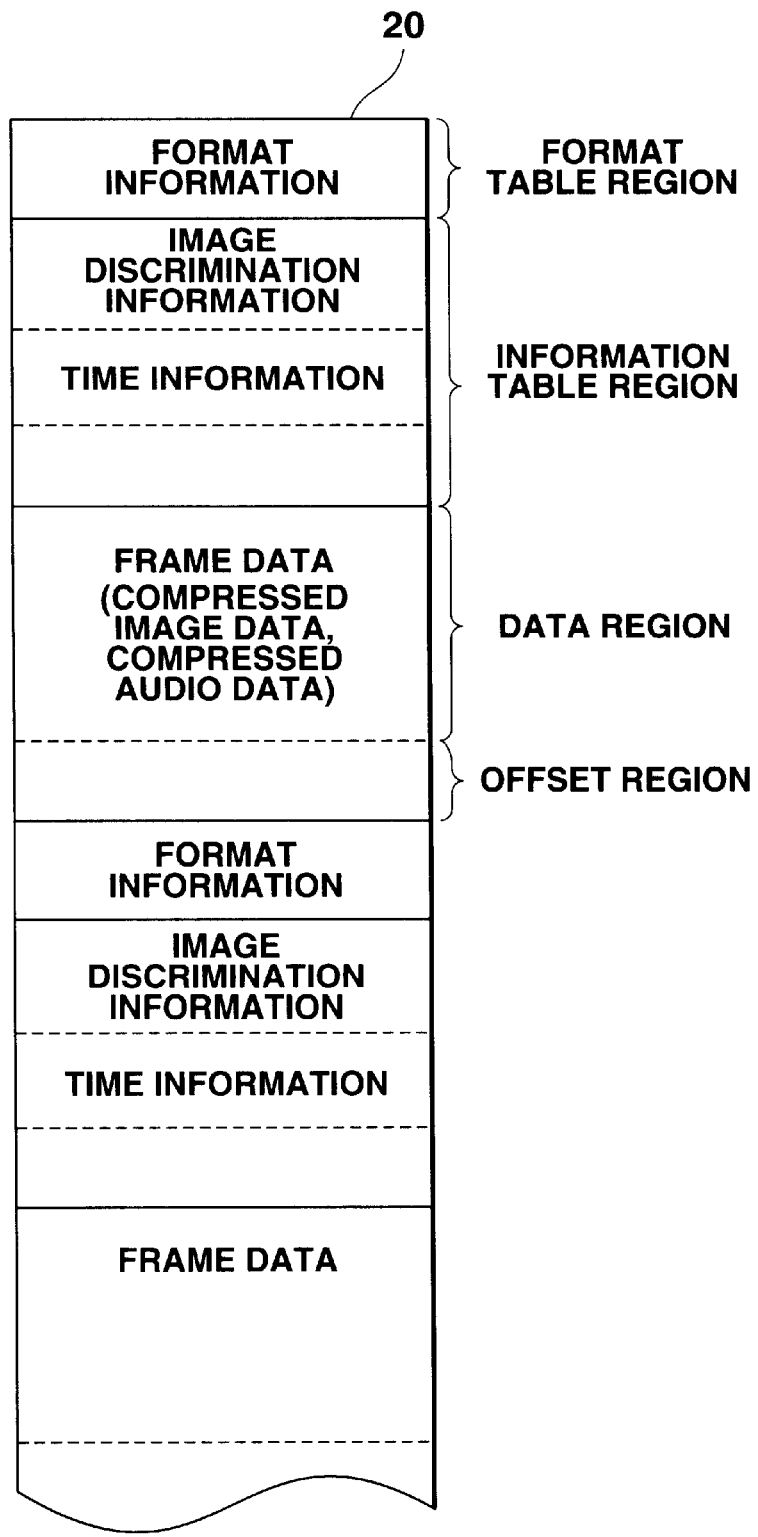
FIG. 3 is a conceptual view showing the internal region of a frame memory.

FIG. 3 is a conceptual view showing the internal region of the frame memory 20.

As shown in FIG. 3, the internal region of the frame memory 20 roughly consists of a format table region, an information table region, a data region and an offset region.

The format table region stores format information which is general information on image information. The information table region stores image information discrimination information including numerical information for discriminating image information and header information for discriminating image information such as time information for indicating the time-series position (time) of moving image data. The data region stores frame data, i.e., compression-coded image signals and audio signals accompanying the image signals in a lump. The offset region stores offset data (blank) for setting the data length of the frame data stored in the data region as a fixed length.

In this way, each frame data is stored in the data region while associating the frame data with the header information stored in the information table region.

(3) Feature Amount Detection Section 31

The feature amount detection section 31 detects the change of the feature amount of the image signal or audio signal from a plurality of frame data stored in the frame memory 20. The feature amount of the image data indicates the brightness, saturation and the like of an object (moving object) or image plane included in the image of the frame data, i.e., the frame image and is required to be capable of appropriately extracting the change of the image. The feature amount of an audio signal indicates the volume (level) or range (frequency band) of an audio signal accompanying the image and is required to be capable of appropriately extracting the change of the audio signal. In other words, the continuous frame data are monitored with respect to predetermined changes of these feature amounts, i.e., a sudden change, such as overrun of a preset threshold value, continuity (non-change state) or the like and the changing characteristics of the images or audio included in a series of frame data (moving image data) are grasped.

It is noted that a feature amount detection method will be described later.

(4) Display Image Selection Section 32

The image selection section 32 selects and extracts specific frame data from among a plurality of frame data stored in the frame memory 20 based on the changing characteristics of the images or audio included in the frame data detected by the feature amount detection section 31 and outputs the frame data to a monitor 50 or a printer 60 either through an image processing section 33 which will be described later or directly. Here, the selection and extraction of specific frame data may be the selection of frame data including an image right after switching the photographic situations clarified by the above-stated image changing characteristics or audio changing characteristics, right after the sudden movement of the object or the selection of the frame data right before or right after the above switching or movement. In other words, the image selection section 32 may select and extract an image capable of making the user of the moving image processor recognize that the feature amount has changed at the time of outputting the data through the monitor 50 or printer 60 to be described later.

(5) Image Processing Section 33

The image processing section 33 processes images included in the frame data selected and extracted by the image selection section 32 into a predetermined expression form.

Processing an image into a predetermined expression form means making an image to be displayed (printed) and outputted large in size, changing a display (print) position, display (print) quality and tone, deforming an image frame (equal-size deformation, magnification or reduction deformation or the like) and the like and changing the form of the image to that in which the image is emphatically displayed compared with other images displayed sequentially or simultaneously.

(6) CPU 30 and Hard Disk 40

The hard disk 40 stores programs to be executed by the CPU 30 and data necessary to operate the CPU 30. The CPU 30, therefore, executes application programs stored in the hard disk 40, thereby realizing the respective functions of the above-stated feature amount detection section 31, the image selection section 32 and the image processing section 33 as software and conducts a series of image processings to be described later, memory management and control of the output of an image to the monitor 50 or printer 60.

(7) Monitor 50 and Printer 60

The monitor 50 or printer 60 displays or outputs the images selected by the image selection section 32 or those processed by the image processing section 33 and is an output device such as a monitor, a printer or the like of a television or PC. In FIG. 1, the monitor 50 and the printer 60 are directly connected to a bus 80. The present invention should not be, however, limited thereto. They may be a facsimile machine, a portable information terminal (PDA), a PC and the like connected by a communication line through a communication interface or the like connected to the bus 80. In the description given herein, the overall image output operations as well as the display and output of images to the monitor 50 and the printout of images to the printer 60 will be referred to as "image output" for convenience sake.

(8) Input Section 70

The input section 70 corresponds to various key switches provided at the moving image processor and generates control signals for executing application programs and image processing by means of the CPU 30, and for outputting images to the monitor 50 or printer 60. The input section 70 also functions as detection level selection means and processing method selection means to be described in a later embodiment. The input section 70 includes not only dedicated key switches provided at the moving image processor but also various input units such as a keyboard, a mouse and a pen tablet in a case the present invention is worked by means of a PC or the like.

In this embodiment, description has been given to a case of fetching data in which audio information is added to or synthesized with image information in advance, as moving image data. The present invention should not be, however, limited thereto and may be applied to a case where respective information, such as image information and audio information right after images are photographed or recorded by a video camera, an electronic still camera or the like, are fetched and processed as different signals. In the latter case, if the fetched information are analog signals, the signals can be inputted to the image signal compression section 14*a* and the audio signal compression section 14*b* through the image A/D 13*a* and the audio A/D 13*b* or if the fetched information are digital signals, the signals can be directly inputted thereto.

Next, the processing operation of the moving image processor constituted as described above will be described with reference to the drawing.

Figure 4:
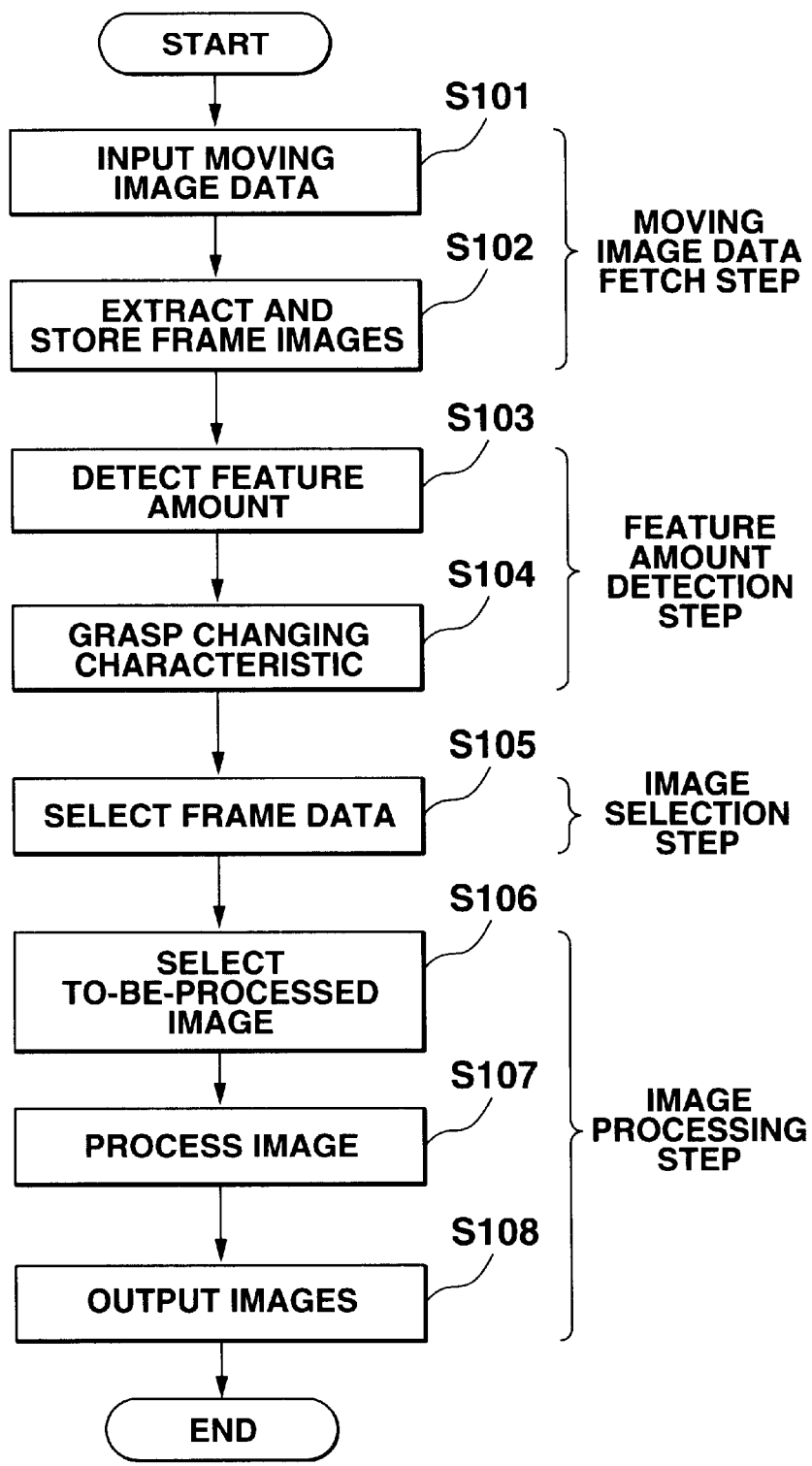
FIG. 4 is a flow chart showing processing operations in the first embodiment.

FIG. 4 is a flow chart showing the processing operation of the moving image processor in this embodiment. Description will be first given to the outline of the processing operation while referring to the above-stated constitution and then description will be given to processing steps one by one.

As shown in FIG. 4, in steps S101 and S102, a series of frame images and accompanying audio information are selected and extracted from the inputted moving image data at predetermined time intervals by the moving image fetch section 10, the frame images and audio information are compression-coded so as to comply with JPEG, MPEG standards and the like, respectively and stored in a predetermined storage region in the frame memory 20. At this time, the compression-coded image signals and audio signals are synthesized into one frame data while associating them with one another and stored with predetermined header information added thereto.

Next, in steps S103 and S104, the feature amount contained in a series of frame data stored in the frame memory is detected by the feature amount detection section 31 and image changing characteristics of the images and audio changing characteristics of the images are grasped.

Then, in step S105, the switching of photographic situations, the sudden movement of an object and the like are discriminated by the image selection section 32 based on the above-stated image and audio changing characteristics and frame data including, for example, an image right after such change are selected. Thereafter, in step S106, the frame data including an image or audio having extremely great change is further selected as to-be-processed images from among the frame data selected in the step S105.

In step S107, processings, such as making images to be outputted large in size, changing a display (print) position, display (print) image quality, image tone, image frame and the like, are conducted to the images selected in the step S106, emphasized images compared with other images (those selected in the step 105 but not selected in the step S106) are created. In step S108, the images selected by the image selection section 32 (including those created by the image processing section 33) are outputted to the monitor 50, printer 60 or the like.

As can be understood from the above, the processing operation of the moving image processor in this embodiment is roughly comprised of a moving data fetch step, a feature amount detection step, an image selection step and an image processing step.

Next, these steps will be described one by one hereinafter with reference to the drawing.

(1) Moving Image Data Fetch Step

Figure 5:
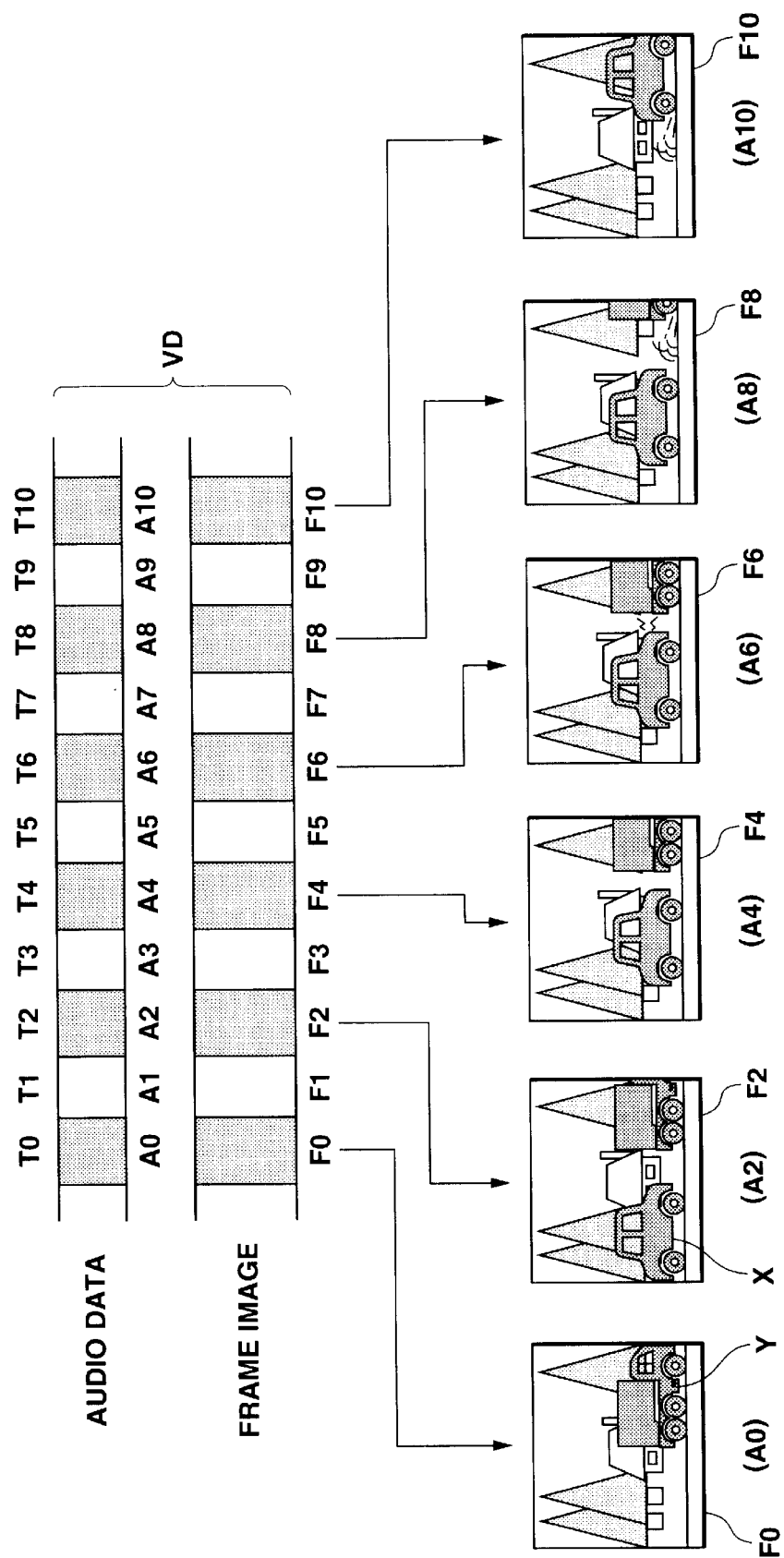
FIG. 5 is a conceptual view showing a moving image fetch step.

FIG. 5 is a conceptual view showing the moving image data fetch step. Now, description will be given thereto, taking, as an example, the movements of a running vehicle X and a stopping vehicle Y serving as objects.

The moving image data photographed with a video camera or an electronic still camera and moving image data such as television broadcasting video information are synthetic data of a collection of a series of frame images arranged in a time series manner and audio information accompanying the frame images. Due to this, in the moving image data fetch step, as shown in FIG. 5, it is assumed that frame images F0, F2, F4, F6, F8, F10, . . . of, for example, times T0, T2, T4, T6, T8, T10, . . . corresponding to time-series positions of moving image data VD together with audio data A0, A2, A4, A6, A8, A10, . . . are selected and extracted from a series of frame images by the moving image data fetch section 10 at predetermined time intervals. The frame images to be selected and extracted may be all of a series of frame images constituting the moving image data VD, i.e., time intervals are not limited to the above-stated ones as long as the change of photographic situations and the movements of the objects can be grasped by means of the extracted frame images and audio information.

The frame images F0, F2, F4, F6, F8, F10, . . . as well as the accompanying audio data A0, A2, A4, A6, A8, A10, . . . thus extracted are converted into digital image signals and digital audio signals, respectively, so as to easily execute signal processing to be described later. They are further subjected to predetermined compression-coding of, for example, JPEG, MPEG systems so as to make effective use of the storage capacity of the frame memory 20, put them together as frame data to be associated with header information and sequentially stored in a predetermined data region.

(2) Feature Amount Detection Step

In this step, the sudden changes and continuous states of the images or audio information are detected from a plurality of frame data stored in the frame memory 20 by the feature amount detection section 31 and the changing characteristics of the images and audio information included in the moving image data are grasped.

Now, a feature amount detection method will be described.

(a) First Feature Amount Detection Method

As the first example of the feature amount detection method, a technique for detecting the movement of an object included in images can be applied. This technique adopts a block matching method in which images of the frame data at different times are divided into block regions, block matching processing is conducted onto a reference image for each block region, the movement of the object between the frames is detected from a coordinate position at which an error is minimum. The block matching method is widely used for the IS11172-2 standard internationally standardized according to ISO/IECJTC1/SC29/WG11 or the like.

Next, the block matching method will be described.

Figure 6:
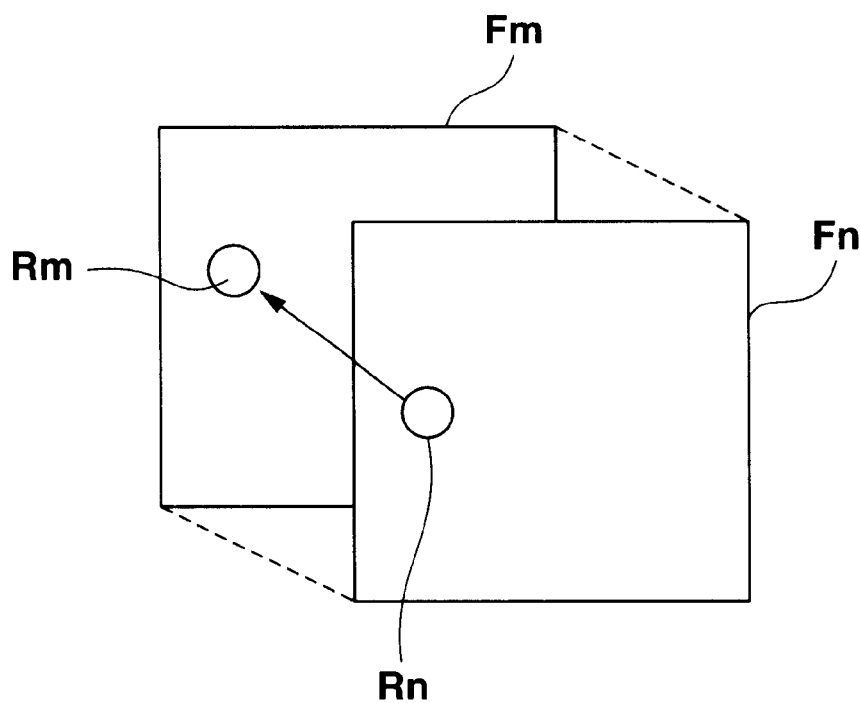
FIG. 6 is a conceptual view showing a block matching method applied to a feature amount detection step.

FIG. 6 is a conceptual view showing the block matching method applied to the feature amount detection step.

The block matching method of detecting the movement of an object included in moving data constituted by a plurality of continuous frame images is described in, for example, "The Institute of Television Engineers of Japan edition, Compression of Image Information, Ohm-sha publisher, page 92, 1991".

According to the above-cited publication, as shown in FIG. 6, pattern matching is conducted to blocks (regions) Rn and Rm at specific positions of a noted image Fn (to be referred to as "present image" for convenience sake) and an image Fm (to be referred to as "previous image" for convenience sake) prior to the Fn by one time period, respectively. In the pattern matching method, the sum S of absolute values of the differences between a pixel Xn in the block Rn and a pixel Xn−i in the block Rm shifted by i pixels from the pixel Xn is obtained according to the following formula (1) and shift position i which can make the absolute value sum S, i.e., a performance value, a minimum is searched to thereby detect a movement amount.

$$S = \Sigma |X_n - X_{n-i}| \tag{1}$$

In this case, the summation $\Sigma$ in the formula (1) is executed for all pixels $X_n$ belonging to the block Rn.

In this way, with the block matching method, it is possible to divide a present image into blocks, positions at which the present image is similar to the previous image are searched in units of blocks by means of pattern matching and to thereby detect the movement of the object included in a series of images.

(b) Second Feature Amount Detection Method

As the second example of the feature amount detection method, a technique for calculating the change of pixel characteristics in a specific region included in an image can be applied. According to this technique, Laplacian processing is conducted to brightness components included in an image and the zero-intersection of the processed image is detected as a region circumference and a portion (object region) enclosed by the continuous circumference is extracted as a specific region. Alternatively, color components included in an image are analyzed and a continuous portion having a less change in color phase is replaced by a typical color and extracted as a specific region. Then, change amounts between the respective images are calculated for the extracted specific region, thereby making it possible to obtain the movement amount of the entire region. Further, the specific region may be set for the entire region of the image and the change amount is calculated, thereby making it possible to detect change such as the switching of photographic situations (scenes).

(c) Third Feature Amount Detection Method

As the third example of the feature amount detection method, a technique for calculating the change of audio characteristics, such as the level of audio information accompanying an image and frequency band, can be applied.

Figure 7:
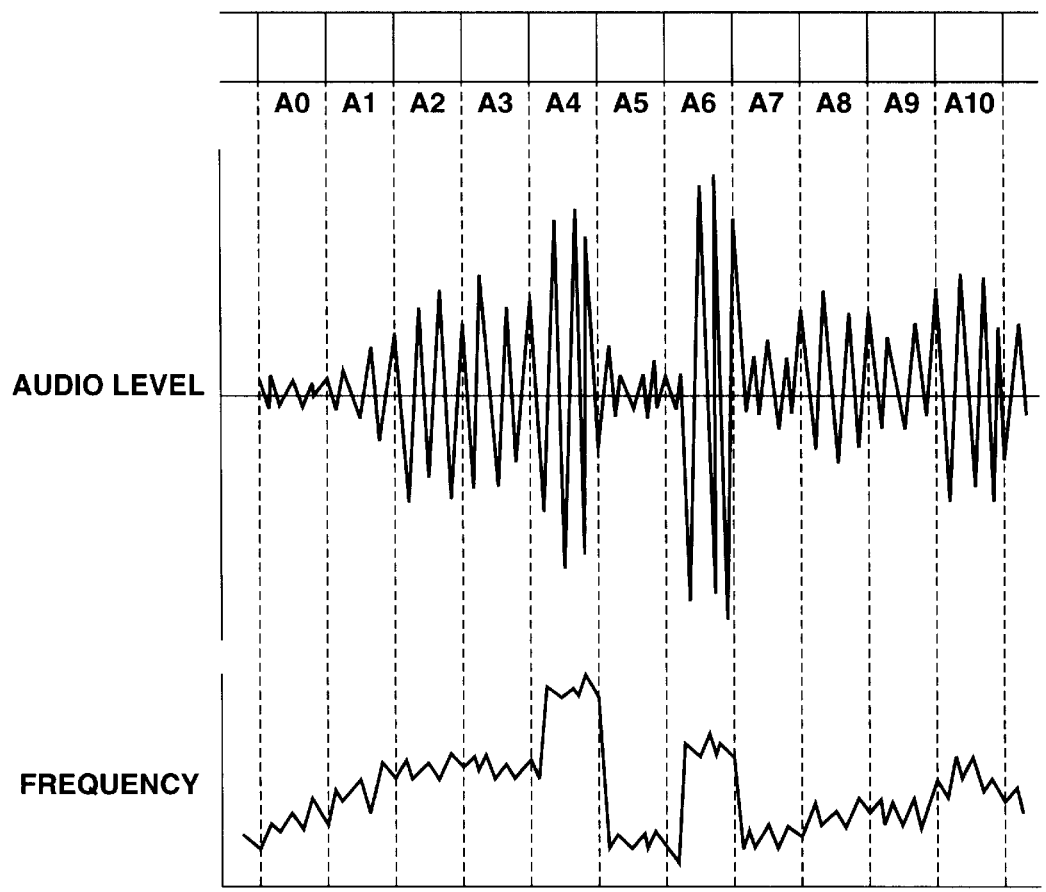
FIG. 7 is a typical view showing the change of voice characteristics.

FIG. 7 is a typical view showing the change of audio characteristics. The upper stage of FIG. 7 is a typical view showing the change of the level of audio information accompanying each image, whereas the lower stage thereof is a typical view showing the change of the frequency band of the audio information.

As shown in the upper stage of FIG. 7, in a case where the levels of audio information accompanying images F0 to F10 are detected as feature amounts, changes of audio characteristics at a level L2 of engine sound while the vehicle X is running, a level L4 of brake sound when the vehicle X stops and a level L6 when Klaxon® rings, a level L8 of engine sound when the vehicle Y starts and a level L10 of engine sound when the vehicle X starts are detected based on audio data A0, A2, A4, A6, A8 and A10.

Meanwhile, as shown in the lower stage of FIG. 7, in a case where the frequency bands of the audio data A0 to A10 accompanying the images F0 to F10, respectively, are detected as feature amounts, changes of sound characteristics of the frequency B2 of engine sound while the vehicle X is running, the frequency B4 of brake sound when the vehicle X stops, the frequency B6 when Klaxon® rings, the frequency B8 of brake sound when the vehicle Y stops and the frequency B10 of engine sound when the vehicle X starts, are detected based on the audio data A0, A2, A4, A6, A8 and A10.

Thus, the movements of the both vehicles and the like can be detected by monitoring the change of audio levels or the change of a state to a soundless state for the continuous images, the transition of frequency bands and the like.

It is noted that the above-stated feature amount detection methods are only examples applicable to the present invention and do not at all limit the embodiments of the present invention. These feature amount detection methods may be either used solely or in an appropriate combination thereof.

(3) Image Selection Step

In this step, the image selection section 32 compares the detected feature amounts with preset threshold values or allowable ranges. If there is a feature amount exceeding its threshold value or allowable range, the frame data image having this feature amount is selected as an output image.

Figure 8:
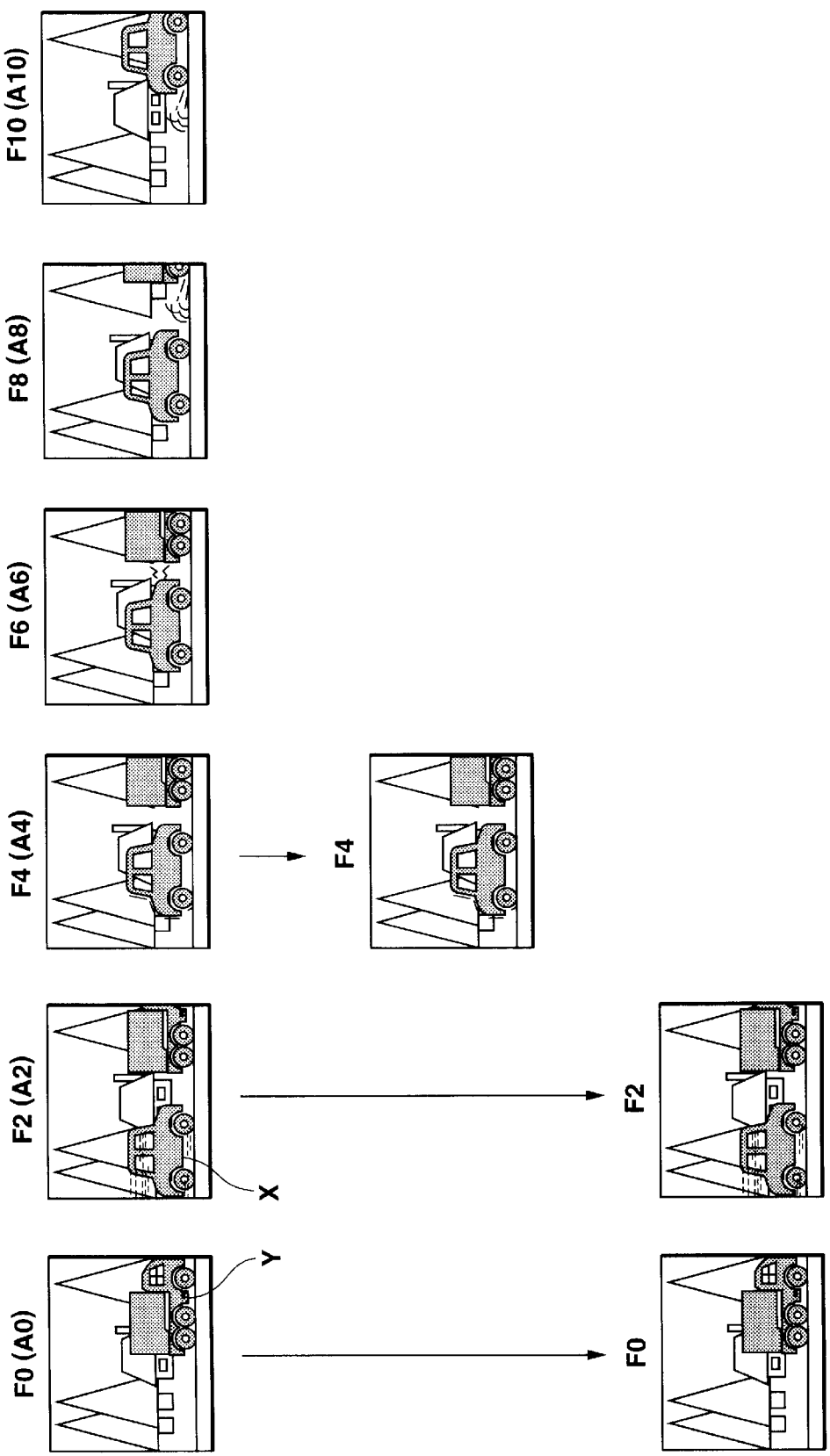
FIG. 8 is a conceptual view showing an example of an image selection step of selecting frame data based on the image changing characteristics.

FIG. 8 is a conceptual view showing an example of the image selection step of selecting frame data based on image changing characteristic.

As shown in FIG. 8, the moving amounts of the vehicles X and Y detected in the above-stated feature amount detection step, the presence/absence of the vehicles X and Y as objects and the like are compared with preset threshold values, and a frame image having the great change of photographic situations and the sudden movement of an object is selected and extracted from a series of frame images F0 to F10 stored in the frame memory 20. If, for example, the constant-speed running state of the vehicle X is detected in the frame image F2, the sudden change of the running speed because of hitting the brakes is detected in the frame F4 and the change amount in the frame image F4 is higher than a preset threshold value or the change amounts in the other frame images, then the frame image F4 is judged and selected as an image having high topicality.

Furthermore, while noting the presence of the vehicle X as an object, if there are a frame image F0 in which the vehicle X is not present and frame images F2 to F10 in which the vehicle X is always present, the frame images F0 and F2 right before and after the appearance of the vehicle X are judged and selected as images having high topicality in the moving image data.

The method of selecting frame data based on image changing characteristics should not be limited to the above and methods using the sudden change of brightness or saturation of an object may be applied. In short, it suffices if the method of monitoring feature amount allows grasping the change of photographic situations and the movements of an object.

Next, description will be given to an example of the image selection step of selecting frame data based on the audio changing characteristics with reference to FIG. 7.

As shown in FIG. 7, the change of the movements of the vehicles X and Y and that of photographic situations in the moving image data are also recorded as audio. Due to this, the audio levels of, for example, engine sound and Klaxon® emitted from the vehicle X, Y or the like and frequency bands detected in the above-stated feature amount detection step are compared with preset threshold values and an frame image having great change in photographic situations and having high topicality is selected and extracted. The level of the audio information emitted from the vehicles X and Y, for example, is shown in the upper stage of FIG. 7. If the audio level L6 when the Klaxon® rings at the audio data A6 is extremely high compared with the level L2 of engine sound while the vehicle X is running at the audio data A2 or a preset threshold (allowable range), then the frame image F6 corresponding to the audio data A6 in the moving image data is judged and selected as an image having high topicality.

Moreover, while noting the frequency bands of audio data emitted from the vehicles X and Y, as shown in the lower stage of FIG. 7, if the frequency B4 of brake sound when the vehicle X suddenly stops at the audio data A4 is extremely high compared with the frequency B2 of engine sound while the vehicle X is running at the audio data A2 or a preset threshold value (allowable range), then the frame image F4 corresponding to the audio data A4 is judged and selected as an image having high topicality in the moving image data.

It is noted that methods of selecting frame data based on the audio changing characteristics should not be limited to the above and that methods using, for example, the sudden change of audio level or frequency or the duration of the same audio situation (such as soundless situation) may be applied to the present invention.

(4) Image Processing Step

In this step, the image processing section 33 selects and extracts an image having higher topicality among the frame images selected by the image selection section 32 as a to-be-processed image, processes the selected image into a predetermined expression form in which the change of photographic situations or the movement of an object is emphasized, and outputs the resultant image as well as other images which are selected by the image selection section 32 but not selected as to-be-processed images, to the monitor 50 or printer 60.

The images outputted to the monitor 50, printer 60 or the like may be set as all of the images fetched by the moving data fetch section 10 and the images processed by the image processing section 33 may be set as all of the images selected by the image selection section 32.

Further, the images emphasized by the image processing section 33 may be set as all of the images fetched by the moving data fetch section 10, all of the images selected by the image selection section 32 or those selected as processing targets by the image processing section 33, and be given changes (weights) in emphasis processing according to the changing degree of the feature amount.

Furthermore, as a method of outputting images to the monitor 50, printer 60 or the like, a method of preferentially outputting emphasis-processed images over other images besides a method of batch-displaying emphasis-processed images together with other images may be adopted. Further, in case of displaying and outputting images by means of scrolling, the switching of the photographic situations or the sudden movement of an object may be informed and recognized using flashing, character display, alarming or the like.

Now, description will be given to emphasis processing applied to the image processing step.

(a) First Emphasis Processing

Figure 9:
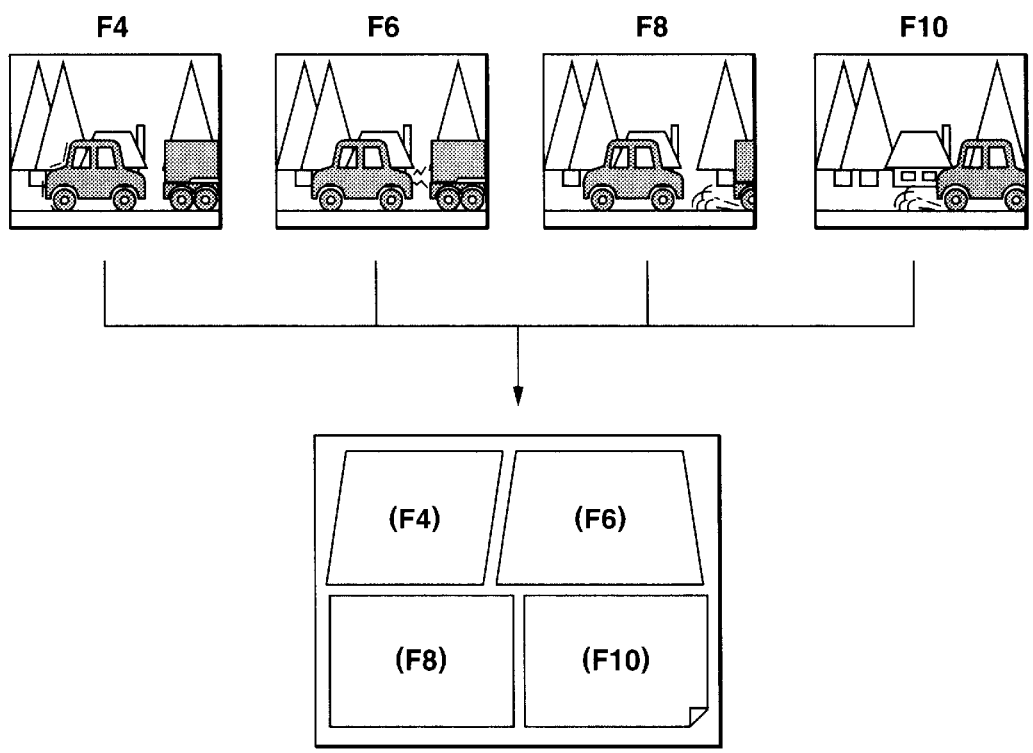
FIG. 9 is a conceptual view showing an example of the first emphasis processing in an image processing step.

FIG. 9 is a conceptual view showing an example of the first emphasis processing in the image processing step.

In the first emphasis processing, the forms of display (print) frames for the frame images selected as processing target images by the image processing section 33 at the time of outputting the images to the monitor 50, printer 60 or the like are changed to the peculiar, different shapes from those of other images (which are selected by the image selection section 32 but not selected by the image processing section 33).

As shown in FIG. 9, if the frame images F4, F6 and F10 having particularly high topicality, such as hitting the brakes, Klaxon® ringing, sudden start, are selected from among the frame images F4, F6, F8 and F10 selected by the image selection section 32, the shapes of the display frames of these frame images are changed from an ordinary square or rectangle (F8) to a trapezoid, a parallelogram, a board frame prepared in advance or the like, whereby still images emphatically expressed for every change in the movement of the vehicle X can be outputted.

Such a change in shape may be desired to emphasize a level of importance of a particular frame image. For example, a frame image of ordinary importance may have an ordinary square or rectangular shape whereas a frame image of high importance may have an eccentric shape to emphasize the importance thereof.

(b) Second Emphasis Processing

Figure 10:
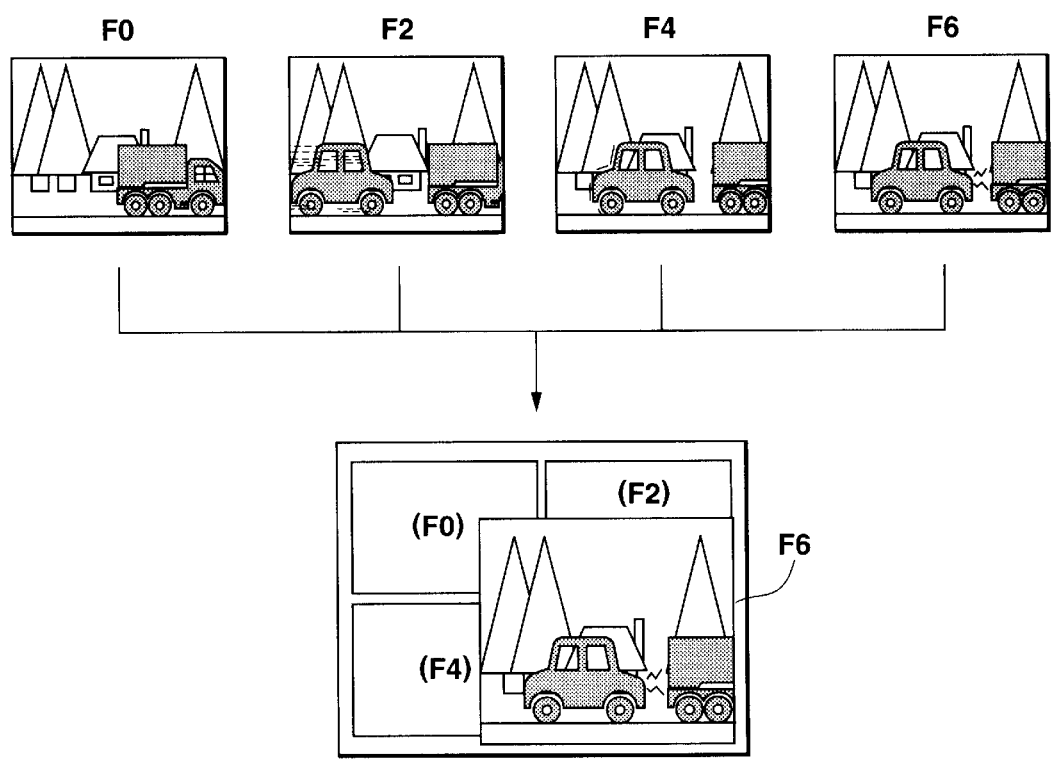
FIG. 10 is a conceptual view showing an example of the second emphasis processing in the image processing step.

FIG. 10 is a conceptual view showing an example of the second emphasis processing in the image processing step.

In the second emphasis processing, the display (printout) sizes of all the frame images selected by the image selection section 32 at the time of displaying (printing) and outputting them are changed to be different from the sizes of the other images (which are fetched by the moving image data fetch section 10 but not selected by the image selection section 32).

As shown in FIG. 10, if, for example, the frame image F6 having high topicality of Klaxon® ringing in the movement of the vehicle X is selected from among the frame images F0, F2, F4 and F6 fetched by the moving image data fetch section 10 by the image selection section 32, then the display (print) size of the frame image F6 is changed so that the frame image F6 of larger size than those of the other frame images (F0, F2 and F4) can be outputted, whereby still images emphatically expressing the change of the movement of the vehicle X can be outputted.

(c) Third Emphasis Processing

Figure 11:
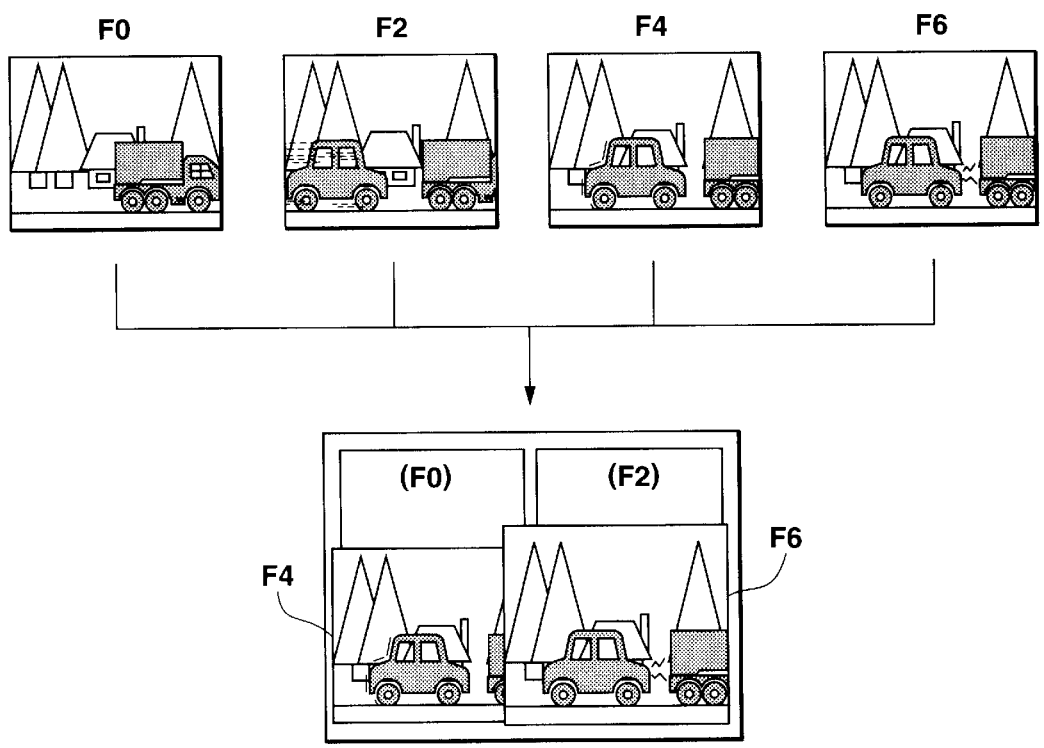
FIG. 11 is a conceptual view showing an example of the third emphasis processing in the image processing step.

FIG. 11 is a conceptual view showing an example of the third emphasis processing in the image processing step.

In the third emphasis processing, the changing rate of the display (print) sizes or display (print) frames is varied according to the changing degree of the feature amount for all the images selected by the image selection section 32 or images selected by the image processing section 33 (or all the images fetched by the moving image fetch section 10).

As shown in FIG. 11, the display (print) size is changed in a stepped or inclined manner in correspondence with the degree of the level of audio data emitted from the vehicle X detected by the feature amount detection section 31. By way of example, the audio levels shown in the upper stage of FIG. 7 are calculated as magnifications with respect to a reference level and the magnifications (e.g., ×1.2) are applied to a reference display (print) size. By doing so, the audio data A4 and A6 having high audio level such as the sound, when hitting the brakes or when Klaxon® rings, emitted from the vehicle X, are processed into display (print) sizes according to the audio levels, whereby the voice changing characteristics can be expressed and outputted as still images. An example of applying the audio level of an object as a feature amount for determining the degree of emphasis processing has been shown herein. This is provided only as an example and should not limit the embodiments of the present invention. Therefore, the degree of emphasis processing may be changed according to the magnitude of the moving amount of an object or the like.

It is noted that the image processing technique should not be limited to the above-stated emphasis processings and that a technique for emphasizing the quality or display gradation of selected frame images compared with that in ordinary display or a technique for changing a display (print) position may be applied to the present invention.

According to this embodiment having a series of steps as described above, the switching of photographic situations or the movement of an object in moving image data can be detected as the change of the feature amount included in images or audio data and a typical image in the moving image data can be emphatically displayed (emphatically printed) based on the feature amount. This makes it possible to easily extract still images from the moving image data and to output them in an expression form which allows the photographic contents to be intuitively recognized.

Second Embodiment

Next, an moving image processor in the second embodiment according to the present invention will be described with reference to the drawings.

In this embodiment, the user of a moving image processor can freely select and set a feature amount as well as an image processing method described in the first embodiment stated above.

Namely, in the moving image processor shown in FIG. 1, the user of the moving image processor operates the input section 70 or inputs a feature amount selection command and a processing method selection command through a communication line or the like which is not shown, thereby selecting a frame image satisfying predetermined conditions based on one of the change of the feature amount of image signals, the change of the feature amount of audio signals or the changes of the feature amounts of the image signals and audio signals. Further, the user selects a processing method for frame images and freely sets an expression form in which the images are outputted to the monitor 50, the printer 60 or the like.

Now, the processing operation of this embodiment will be described with reference to the flow chart of FIG. 12. It is noted that equivalent steps to those in the above-stated first embodiment will not be described herein.

Figure 12:
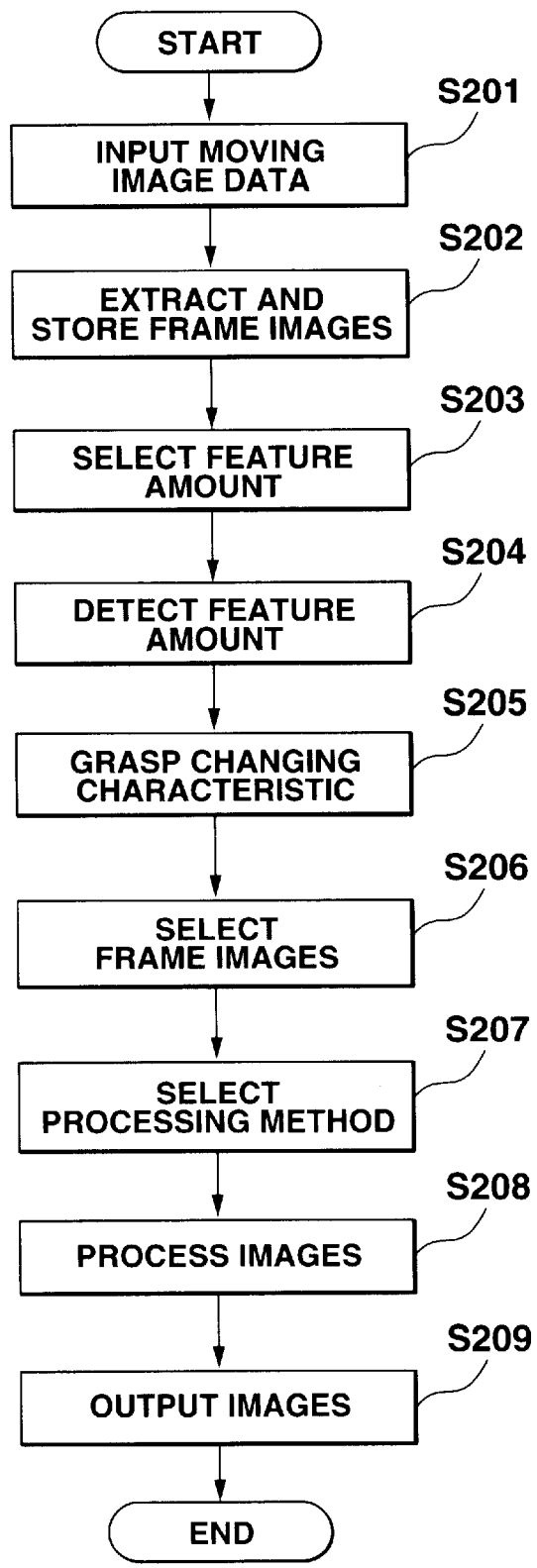
FIG. 12 is a flow chart showing processing operations in the second embodiment according to the present invention.

As shown in FIG. 12, in steps S201 and S202, a series of frame images and audio information accompanying the frame images are selected and extracted from moving image data at predetermined time intervals, and they are compression-coded and stored in a predetermined storage region of the frame memory 20.

Next, in steps S203, S204 and S205, the change of the feature amount selected and instructed by the user through the input section 70 or the like is detected with respect to the series of frame images and audio information stored in the frame memory 20, and the image changing characteristics or audio changing characteristics are grasped. That is, if the frame images selected in an image selection step to be described later vary depending on whether the feature of the moving data photographed and recorded corresponds to the image changing characteristics or the audio changing characteristics, frame images having desired photographic contents are outputted by the user's instruction of the feature amount to be detected.

Next, in step S206, the image selection section 32 selects frame images including the switching of photographic situations, the sudden movement of an object or the like based on the image changing characteristics or audio changing characteristics stated above. In steps S207 and S208, the selected frame images are subjected to an image processing selected and instructed by the user through the input section 70 or the like. In this case, an arbitrary processing method is selected from among a plurality of image processing methods including the above-stated emphasis processings. For example, the display (print) size of a frame image indicating the switching of photographic situations or the change of an object is made larger than those of ordinary frame images, the display (print) frame thereof is deformed, the display (print) frame is controlled such as moving the display (print) position of the image to the center of a monitor screen, the brightness or saturation of a display image plane (print plane) is emphasized or display (print) quality is controlled such as flashing or the like.

Then, in step S209, the frame image processed by the image processing section 33 is outputted to the monitor 50, the printer 60 or a facsimile machine, PDA, PC or the like connected through a communication line or the like.

According to this embodiment having a series of steps stated above, a user can arbitrarily select a feature amount and an image processing method, so that a frame image having desired photographic contents (change of the feature amount) can be outputted in an expression form having good visibility.

In this embodiment, description has been given to a case where the user arbitrarily selects and sets both the feature amount and the image processing method; however, the user may select and set either the feature amount or the image processing method.

Needless to say, the moving image processors and moving image processing methods described in the embodiments can be well realized by incorporating them into not only the above-stated video camera, electronic still camera and PC but also image processing equipment such as a video player, a facsimile machine, a printer and the like, or by providing them as application software.

In the above embodiments, the image size is enlarged or the image frame is deformed. Alternatively, other attributes of the image such as color and brightness may be changed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving image processor comprising:

detection means for detecting a degree of change in one of a moving image and audio data accompanying the moving image;

image processing means for changing one of a shape and size of each of still images serving as constituent elements of the moving image in accordance with the detected degree of change; and image output means for outputting the still images having one of the shape and the size changed by the image processing means;

wherein at least one of the still images output by the image output means differs in at least one of shape and size from respective other ones of the still images output by the image output means.

2. A moving image processor according to claim 1, further comprising image extraction means for extracting from the moving image still images of a portion at which the detected degree of change satisfies predetermined conditions;

wherein the image processing means makes one of the shape and the size of each of the still images extracted by the image extraction means different from one of a standard shape and a standard size; and wherein the image output means outputs the still images processed to have the non-standard one of the shape and size, and outputs still images in the moving image, which are not extracted by the image extraction means, in one of the standard shape and the standard size.

3. A moving image processor according to claim 1, further comprising image extraction means for extracting from the moving image still images of a portion at which the detected degree of change satisfies predetermined conditions;

wherein the image processing means changes one of the shape and the size of each of the still images extracted by the image extraction means in accordance with the detected degree of change.

4. A moving image processor according to claim 3, further comprising second image extraction means for extracting from the extracted still images a still image having a detected degree of change satisfying predetermined conditions;

wherein the image processing means makes one of a shape and a size of the still image extracted by the second image extraction means different from one of a standard shape and a standard size; and wherein the image output means outputs the still image processed to have one of the shape and the size different from one of the standard shape and the standard size, and outputs still images extracted by the image extraction means and not extracted by the second image extraction means in one of the standard shape and the standard size.

5. A moving image processor according to claim 1, wherein the image output means comprises a display for displaying the still images.

6. A moving image processor according to claim 1, wherein the image output means comprises a printer for printing out the still images.

7. A moving image processor according to claim 1, further comprising detection level selection means for selecting a detection level of the degree of change detected by the detection means.

8. A moving image processor according to claim 1, further comprising processing method selection means for selecting a processing method by which the still images are processed by the image processing means.

9. A moving image processor comprising:
   detection means for detecting a degree of change in audio data accompanying a moving image;
   image processing means for changing an attribute of each of still images serving as constituent elements of the moving image in accordance with the detected degree of change; and
   image output means for outputting the still images processed by the image processing means to have the changed attribute;
   wherein at least one of the still images output by the image output means differs in form from respective other ones of the still images output by the image output means.

10. A moving image processor according to claim 9, wherein the detection means detects the degree of change of audio level.

11. A moving image processor according to claim 9, wherein the detection means detects the degree of change of frequency of the audio data.

12. A moving image processing method, comprising the steps of:
   detecting a degree of change in one of a moving image and audio data accompanying the moving image;
   changing one of a size and a shape of each of still images serving as constituent elements of the moving image in accordance with the detected degree of change; and
   outputting the still images having one of the changed shape and size;
   wherein at least one of the output still images differs in at least one of shape and size from respective other ones of the output still images.

13. A moving image processing method, comprising the steps of:
   detecting a degree of change in audio data accompanying a moving image;
   changing an attribute of each of still images serving as constituent elements of the moving image accordance with the detected degree of change in the audio data; and
   outputting the still images having the changed attribute;
   wherein at least one of the output still images differs in form from respective other ones of the output still images.

* * * * *